US007774162B2

(12) United States Patent
Watanabe et al.

(10) Patent No.: US 7,774,162 B2
(45) Date of Patent: *Aug. 10, 2010

(54) ELECTRONIC TIMER AND SYSTEM LSI

(75) Inventors: Hiroshi Watanabe, Yokohama (JP); Atsuhiro Kinoshita, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 246 days.

This patent is subject to a terminal disclaimer.

(21) Appl. No.: 12/015,147

(22) Filed: Jan. 16, 2008

(65) Prior Publication Data

US 2008/0140344 A1 Jun. 12, 2008

Related U.S. Application Data

(62) Division of application No. 11/469,706, filed on Sep. 1, 2006, now Pat. No. 7,343,263.

(30) Foreign Application Priority Data

Oct. 12, 2005 (JP) ............................ 2005-298016

(51) Int. Cl.
*G04F 10/00* (2006.01)
*G06F 11/00* (2006.01)

(52) U.S. Cl. ...................................... 702/176; 714/744

(58) Field of Classification Search ................. 702/176, 702/177, 117; 324/765, 76.11, 464; 714/744, 714/738
See application file for complete search history.

(56) References Cited

U.S. PATENT DOCUMENTS

| | | | | |
|---|---|---|---|---|
| 5,414,663 | A * | 5/1995 | Komarek et al. | 365/207 |
| 5,760,644 | A | 6/1998 | Lancaster et al. | |
| 6,811,083 | B2 | 11/2004 | Kojima et al. | |
| 7,075,284 | B2 | 7/2006 | Watanabe et al. | |
| 7,121,472 | B2 | 10/2006 | Shimizu et al. | |
| 7,134,600 | B2 | 11/2006 | Tomoeda et al. | |
| 7,208,933 | B2 | 4/2007 | Watanabe et al. | |
| 7,343,263 | B2 * | 3/2008 | Watanabe et al. | 702/176 |
| 7,665,004 | B2 * | 2/2010 | Suda et al. | 714/744 |
| 2004/0149816 | A1 | 8/2004 | Tomoeda et al. | |
| 2004/0150468 | A1 | 8/2004 | Shimizu et al. | |
| 2006/0087360 | A1 | 4/2006 | Watanabe | |
| 2006/0179416 | A1 | 8/2006 | Watanabe | |
| 2007/0030747 | A1 | 2/2007 | Hirai | |
| 2007/0158699 | A1 | 7/2007 | Watanabe et al. | |

FOREIGN PATENT DOCUMENTS

| | | |
|---|---|---|
| JP | 9-127271 | 5/1997 |
| JP | 10-189780 | 7/1998 |
| JP | 2002-246887 | 8/2002 |
| JP | 2004-172404 | 6/2004 |

* cited by examiner

*Primary Examiner*—Bryan Bui
(74) *Attorney, Agent, or Firm*—Oblon, Spivak, McClelland, Maier & Neustadt, L.L.P.

(57) ABSTRACT

A system LSI including a semiconductor chip which receives power from a power supply, and an electronic timer which measures a time from an interruption of power supplying to the semiconductor chip to a resumption of power supplying to the semiconductor chip.

14 Claims, 8 Drawing Sheets

| | Time | Sum drain-current |
|---|---|---|
| Initial value → | 0 | ID 0 |
| | τ1 | ID 1 |
| | τ1+τ2 | ID 2 |
| | τ1+τ2+τ3 | ID 3 |
| | ⋮ | ⋮ |
| | τ1+τ2+・・・+τN | ID N |

ELECTRONIC TIMER AND SYSTEM LSI

CROSS-REFERENCE TO RELATED APPLICATIONS

This application is a divisional of application Ser. No. 11/469,706, filed Sep. 1, 2006, which claims priority under 35 U.S.C. §119 to Japanese Patent Application No. 2005-298016 filed in the Japanese Patent Office on Oct. 12, 2005, the entire contents of both of which are being incorporated herein by reference.

BACKGROUND OF THE INVENTION

1. Field of the Invention

The present invention relates to an electronic timer having an aging device that is on or off for a specific time because of the charge accumulated in it. The invention relates to a system LSI that has such an electronic timer.

2. Description of the Related Art

Any system LSI available at present incorporates a timer module that safeguards the system LSI against an abrupt power failure due to, for example, a blackout. The timer module is composed of a micro-battery, a quartz-crystal resonator, and a timer controller. The timer controller is provided in the system chip. The micro-battery and the quartz-crystal resonator, which are arranged outside the system chip, are particularly expensive, raising the manufacturing cost of the system LSI.

One of the methods of solving this problem is to fabricate, in the system LSI chip, an electronic device that is an integrated circuit capable of informing, in a battery-less mode, how long the system LSI has been exposed to a blackout. The inventors hereof have proposed a solid state aging device (SSAD) that can be integrated in the system LSI and can control, without batteries, the time for which the system LSI can operate. (See JP-A 2004-172404(KOKAI).) This aging device is designed to read digital data representing transition of the on/off state. Therefore, the aging device must have a great number of aging-device cells if it is to operate as a timer.

A method of reading time from a very small change in a current at on level is disclosed in, for example, U.S. patent Ser. No. 09/703,344. This method requires large capacitors to stabilize changes in time. The aging is inevitably determined by the thin part of the tunnel insulating film of each large capacitor. Hence, it is difficult to control the difference between individual devices. A method of disclosed, in which SONOS is used to read time from a very small current at on level. However, this method can hardly control the difference between individual devices, either, because the traps in the insulating film are used in the method.

As indicated above, the conventional system LSI needs to have a timer module for measuring the time at which the LSI should start operating normally after the interruption of power supply. An aging device that operates without batteries may be used as an electronic timer. In this case, the device needs to have a great number of aging-device cells. This results in an increase in the manufacturing cost of the system LSI.

BRIEF SUMMARY OF THE INVENTION

In accordance with a first aspect of the invention, there is provided an electronic timer comprising:

a parallel unit comprised of a plurality of aging devices connected in parallel and having an input terminal and output terminal, each of the aging devices being configured to be turned from on to off, or, from off to on without power supply for a predetermined time defined with the amounts of stored electric charge and formed of a transistor which includes a floating gate storing the electric charge;

a current detecting unit configured to detect a sum current of currents flowing in the aging devices of the parallel unit; and a time measuring unit configured to measure a time from immediately after interruption of power supplying to resumption of power supplying from the sum current.

In accordance with a second aspect of the invention, there is provided an electronic timer comprising:

a parallel unit comprised of a plurality of aging devices connected in parallel and having an input terminal and output terminal, each of the aging devices being configured to be turned from on to off, or, from off to on without power supply for a predetermined time defined with the amounts of stored electric charge and formed of a transistor including a floating gate storing the electric charge;

a current detecting unit configured to detect a sum current of currents flowing in the aging devices of the parallel unit;

an elapse-time table which stores an elapse-time change characteristic representing a relation between the sum current and a time that has elapsed from the storing of the electric charge in each of the aging devices;

a first memory which stores a first sum current detected by the current detecting unit immediately before interruption of power supplying;

a second memory which stores a second sum current detected by the current detecting unit at resumption of power supplying; and an elapse-time measuring unit which measures a time from immediately after interruption of power supplying to resumption of power supplying, using the first sum current and second current stored in the first memory and second memory, respectively, and the elapse-time change characteristic stored in the time table.

In accordance with a third aspect of the invention, there is provided a system LSI comprising:

a semiconductor chip which receives power from a power supply;

an electronic timer which measures a time from an interruption of power supplying to the semiconductor chip to a resumption of power supplying to the semiconductor chip, the timer including:

a parallel unit comprised of a plurality of aging devices connected in parallel and having input and output terminals, each of the aging devices being configured to be turned from on to off, or, from off to on without at any power supply for a predetermined time defined with the amounts of stored electric charge and formed of a transistor which includes a floating gate;

a current detecting unit configured to detect a sum current of currents flowing in the aging devices of the parallel unit when a voltage is applied between the input and output terminals of the parallel unit; and a time measuring unit configured to measure a time from immediately after interruption of power supplying to resumption of power supplying from the sum current.

BRIEF DESCRIPTION OF THE SEVERAL VIEWS OF THE DRAWINGS

FIG. 14 is a diagram explaining how the distribution of gate area is broader extended because of bird's beaks, a gate overlapping effect and the like;

DETAILED DESCRIPTION OF THE INVENTION

The present invention will be described in detail, with reference to the embodiments shown in the accompanying drawings.

First Embodiment

Figure 1:
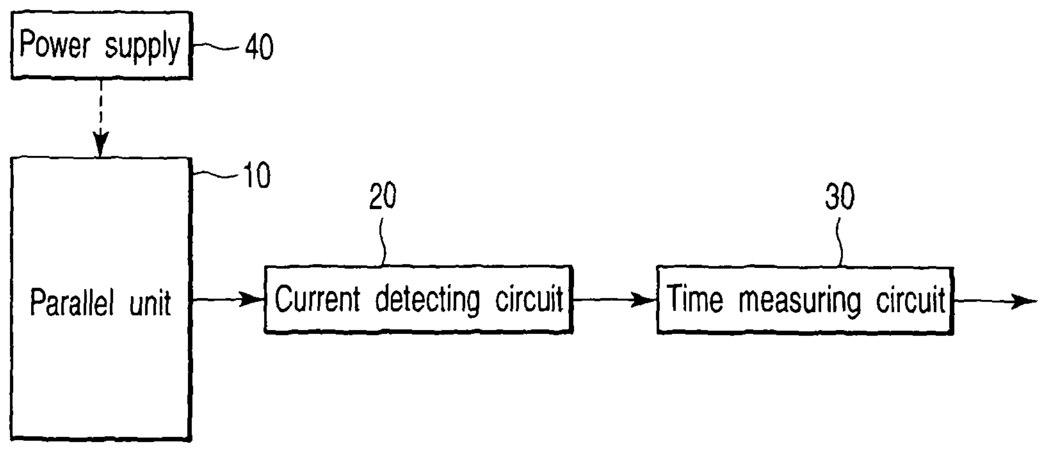
FIG. 1 is a block diagram showing the basic configuration of an electronic timer according to a first embodiment of this invention.

FIG. 1 is a block diagram showing the basic configuration of an electronic timer according to a first embodiment of this invention.

As FIG. 1 shows, the electronic timer comprises a parallel unit 10, a current detecting circuit 20, a time measuring circuit 30, and a power supply 40. The parallel unit 10 is composed of a plurality of aging devices that are connected in parallel. The current detecting circuit 20 detects the sum of the currents flowing in the aging devices of the parallel unit 10. The time measuring circuit 30 measures the time that elapses after the supplying of power is interrupted until the supplying of power is resumed.

Figure 2:
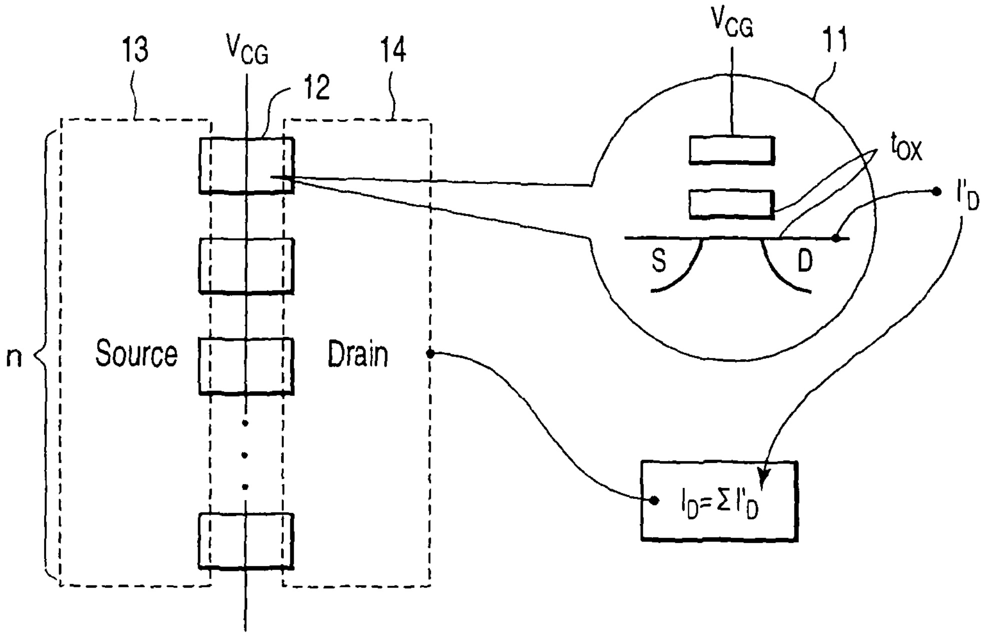
FIG. 2 is a schematic plan view depicting the parallel unit used in the electronic timer according to the first embodiment.

As FIG. 2 shows, the parallel unit 10 is two-gate transistors each having a floating gate and a control gate. Namely, it is composed of n aging devices 11 connected in parallel. Each aging device 11 remains on for a specific time, while electric charge is stored, and turns of after the specific time is elapsed, or remains off for a specific time, while electric charge is stored, and turns on after the specific time is elapsed. The n aging devices 11 have their control gates connected together, their sources connected together, and their drains connected together. A gate voltage is applied to the common gate 12 at regular intervals. A voltage is applied to the common source (input terminal) 13. The sum current flowing in the common drain (output terminal) 14 is detected by the current detecting circuit 20.

The sum current is not detected at all times, but only immediately before the supplying of power is interrupted and immediately after the supplying of power is resumed. This is because the parallel unit 10 needs the current supplied from the power supply 40 only. Even if the power supply 40 fails to supply power to the parallel unit 10, power need not be supplied to the unit 10 from, for example, a battery. Hence, the present embodiment can operate without batteries after the supplying of power is interrupted and before the supplying of power is resumed.

Figure 3A:
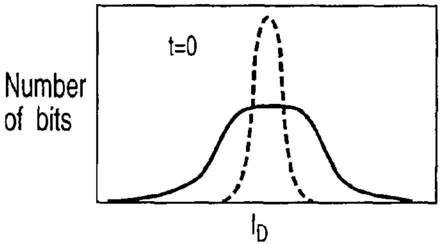
FIGS. 3A to 3C are diagrams illustrating the concept of averaging the cells that constitute a group and greatly differ in characteristics.
Figure 3B:
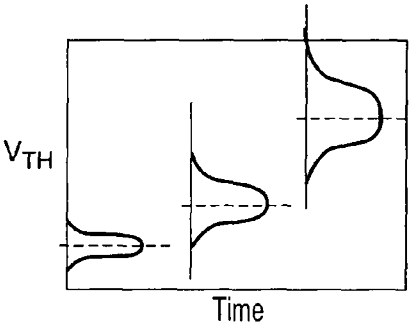
Figure 3C:
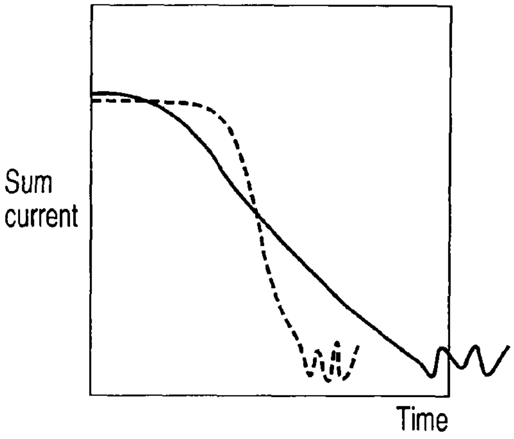

FIGS. 3A to 3C show the difference in characteristics between two cell groups, one (solid line) consisting aging devices connected in parallel as shown in FIG. 2 and being, by design, greatly different in characteristic, and the other (broken line) consisting of aging devices connected in parallel as shown in FIG. 2 and being different a little in characteristics.

FIG. 3A shows how the two cell groups differ in terms of the current (ID) flowing at time t0 (that is, immediately after write). The current (ID) is plotted on the x-axis, and the number of bits (cells) on the y-axis. The solid line curves gently, whereas the broken line curves sharply. Obviously, the cells of the first group are greatly different in current, too, and those of the second group are slightly different in current, too.

FIG. 3B shows how the distribution of threshold voltage ($V_{TH}$) changes with time. Time is plotted on the x-axis, and the threshold voltage ($V_{TH}$) on the y-axis. The distribution (the number of bits) is plotted with the solid line at each time. As seen in FIG. 3, this distribution becomes broader with time, while the center of the distribution (the average of $V_{TH}$) is increased with the time. This charge in voltage $V_{TH}$ is prominent when the sum current changes from on-state to off-state. If the aging devices of a group slightly differ each of the in $V_{TH}$ (the distribution is sharp), the sum current will change quickly with time. If the aging devices of a group much differ in $V_{TH}$ (the distribution is broad), the sum current will change gradually with time. Hence, the distribution is broader at the final stage of transition than at initial stage thereof.

FIG. 3C shows how the sum current changes with time. Time is plotted on the x-axis, and the sum current on the y-axis. As the solid line indicates, the sum current of the first cell group changes slowly because the constituent aging devices greatly differ, by design, in characteristics. On the other hand, the sum current of the second cell group changes sharply because the constituent aging devices are different little bit in characteristics. In the present embodiment, it is desirable to use aging devices that greatly differ in characteristics, so that an elapse time may be read from a slowly changing sum current.

Figure 4:
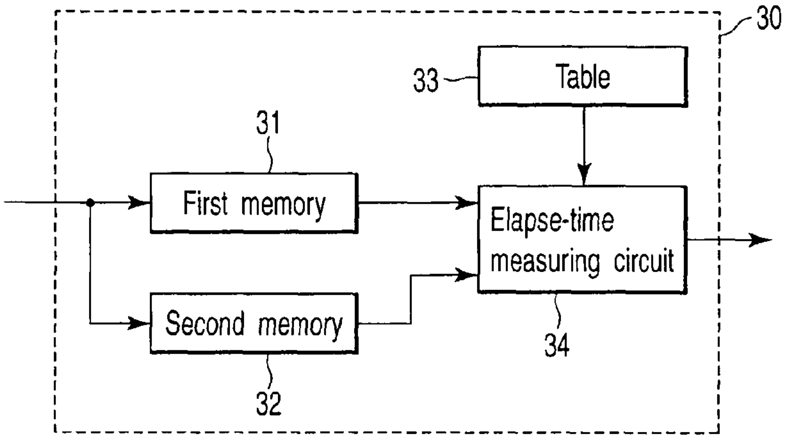
FIG. 4 is a block diagram showing the configuration of the time measuring circuit used in the first embodiment.

As shown in FIG. 4, the time measuring circuit 30 is composed of a first memory 31, a second memory 32, an elapse-time table 33, and an elapse-time measuring circuit 34. The first memory 31 comprises nonvolatile memory cells and is designed to store the value of the sum current that the current detecting circuit 20 detects jest before the supplying of power is interrupted. The second memory 32 comprises nonvolatile memory cells, too, and is designed to store the value of the sum current that the current detecting circuit 20 detects just after the supplying of power is resumed. The first and second memories 31 and 32 may be replaced by one memory unit that has two storage regions, which are used as two memories.

The elapse-time table 33 is a device that stores the relation between the sum current of the parallel unit 10 and the time elapsed after a charge is stored in each aging device. This relation is used as elapse-time change characteristic. In this embodiment, the table 33 stores elapse-time change characteristic that has been measured beforehand. The elapse-time measuring circuit 34 is configured to measure the time that elapses from the moment the supplying of power is interrupted to the moment the supplying of power is resumed, on the basis of the sum currents stored in the first and second memories 31 and 32 and the elapse-time change characteristic stored in the table 33.

A practical method of reading time will be explained.

The sum current is read immediately before the supplying of power is interrupted. The sum current thus read is stored into the first memory 31. When the supplying of power is resumed upon lapse of an appropriate time from the interruption of power supplying, the sum current is read and stored into the second memory 32. The time during which the supplying of power remains interrupted is read on the basis of the sum current stored in the first memory 31, the sum current stored in the second memory 32 and the elapse-time change characteristic stored in the table 33. If the elapse-time change characteristic is indicated by a straight line, the current values stored in the first and second memories 31 and 32 may be compared. Then, the time elapsed while the supplying of power remains interrupted can be read from the difference between the current values.

Whether the elapse time thus read is sufficiently correct is important. Although the cells greatly differ from one another in this embodiment, they are sufficiently averaged in characteristics in the cell group. That is, if the cells are aging devices made on the same manufacture line, they will necessarily be similar in characteristics. Therefore, an accidental error, if any, is far smaller in the present parallel unit than the conventional timer cells that are comprised of large capacitors and in-film traps.

Another advantage of the averaging is the high reproducibility of elapse-time change characteristic. Once the elapse-time change characteristic is acquired for the sum current before the electronic timer is shipped, it can be thereafter reproduced when the timer is used. This can reduce the error of reading the time. This high reproducibility of elapse-time change characteristic is the greatest characterizing feature of the present invention.

Figures 5, 6:
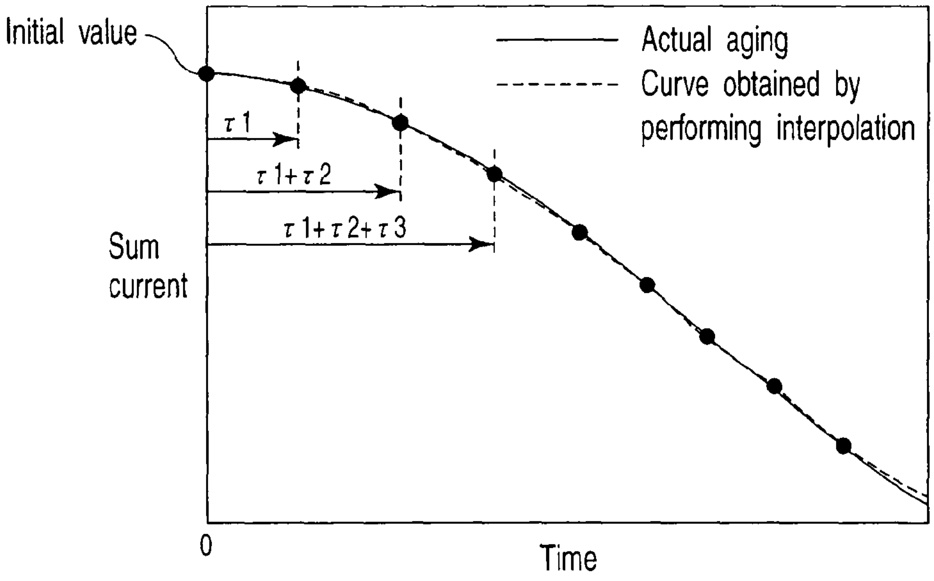
FIG. 5 is a table of various aging characteristics.
FIG. 6 is a diagram explaining a method of interpolating aging characteristics.

A method of acquiring the table of elapse-time change characteristic will be explained. The aging devices 11 that constitute the parallel unit 10 are pMOS transistors of normally-off type. First, the control-gate voltage $V_{CG}$ of the devices 11 is set to high level (H). Electrons are thereby injected into the floating gate of each device 11 from the channel by virtue of FN tunneling. After this programming, $V_{CG}$ is set back to zero ($V_{CG}$=0V). Then, drain voltage $V_D$ is applied, thus measuring the sum current ID. Voltage $V_D$ is set back to 0V ($V_D$=0V). The sum current ID0 measured is stored as initial value into the nonvolatile memory incorporated in the table 33. As shown in FIG. 5, the time when the initial value is measured is regarded as time zero (0). Next, the electronic timer is left to stand for a predetermined period ($\tau_1$), while the voltage both $V_{CG}$ and $V_D$ are being set to 0V ($V_{CG}$=$V_D$=0V). Thereafter, the drain voltage $V_D$ is applied, whereby a sum current (ID1) is measured. The drain voltage $V_D$ is set to 0V again and the electronic time is left stand for a specific period ($\tau_2$). Then, the drain voltage $V_D$ is applied and a sum current (ID2) is measured. The table of FIG. 5 shows the case where the application of voltage $V_D$ and the measuring of sum current are repeated N times.

Assume that power failure in Japan lasts for about one hour at most. Then, measures against any power failure can be taken merely by setting the sum of periods $\Sigma_1$ to $\tau_N$ at 2 to 3 hours at most. The sum of periods can of course be changed as needed. The aging characteristics may change as the devices 11 constituting the parallel unit 10 undergo aging. In such a case, it suffices to update, at regular intervals, the information that should be stored into the table 33.

The number N of times the sum current is measured cannot be infinitely large. The data items in the table 33 are inevitably spaced apart in time. To fill up the spaces, it is desirable to use an interpolation curve. The simplest method is linear approximation, but polynomials or exponential functions might be preferable. FIG. 6 shows an example of the interpolation. In this example, linear approximation that is the simplest method is utilized. Nonetheless, the more data items are acquired, the more similar the result is to the actual aging characteristic.

Such an elapse-time table is used in the following way. First, the change in the power supplied is sensed immediately before a power failure. Then, voltage $V_{CG}$ is set to high level and a charge is stored in each aging device 11 of the parallel unit 10 (data is programmed). Since this programming cannot be verified, it is difficult set each aging device 11 to the initial state. Nonetheless, voltage $V_D$ is applied right after the data is programmed, and the sum current IDA is measured and written into the first memory 31. The steps up to this are performed before the interruption of power supplying.

On the other hand, charge may be stored in each aging device 11 of the parallel unit 10 at regular intervals. Then, charge need not be stored in the device 11 immediately before the interruption of power supplying. Whenever a power failure occurs, the power-supply voltage or the like changes immediately before the power failure takes place. Thus, the state of aging devices 11 connected in parallel immediately before the power failure can be determined by detecting the change in the power-supply voltage. A power-failure detector of the known type can be utilized to detect this change.

Figure 7:
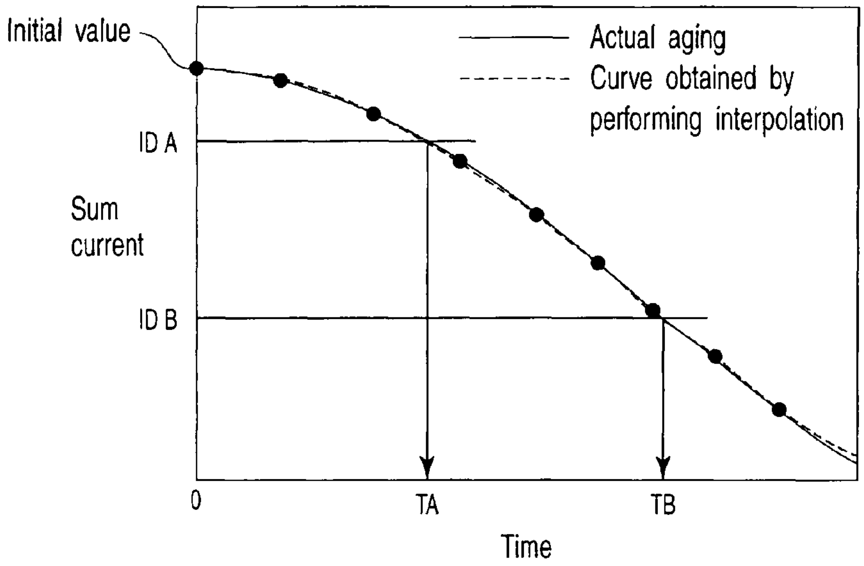
FIG. 7 is a diagram explaining a method of reading an elapse time from the aging characteristics.

When the supplying of power is resumed, voltage $V_D$ is immediately applied, and the sum current IDB is then measured and written into the second memory 32. Thereafter, the elapse-time measuring circuit 34 composed the sum currents IDA and IDB. The circuit 34 converts these currents IDA and IDB to time TA and time TB at which the currents IDA and IDB have been read, as is illustrated in FIG. 7. The circuit 34 measures the period between time TA and time TB as time that has elapsed during the power failure. If the electronic timer according to this embodiment is incorporated in the system LSI, the time measured by the elapse-time measuring circuit 34 will be transferred to the system LSI after the supplying of power to the system LSI is resumed.

A method of intentionally differentiating the aging devices of this embodiment in terms of characteristic will be described.

Figure 8A:
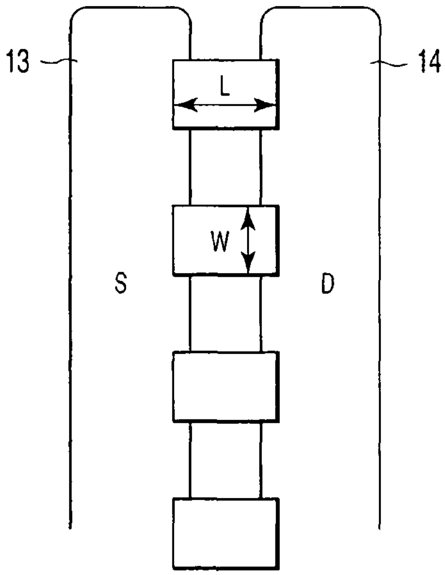
FIGS. 8A to 8C are diagrams representing the concept of averaging the cells of a large group, which greatly differ in characteristics.
Figure 8B:
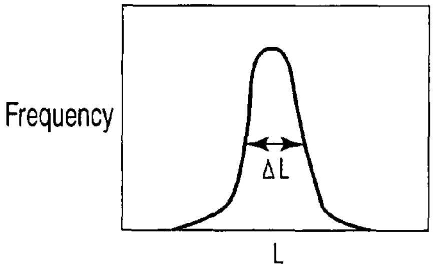
Figure 8C:
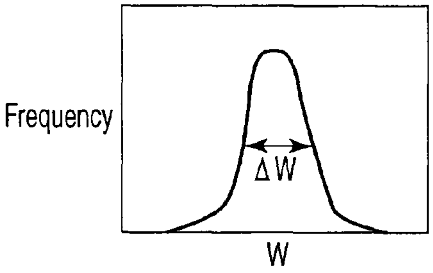
Figure 9:
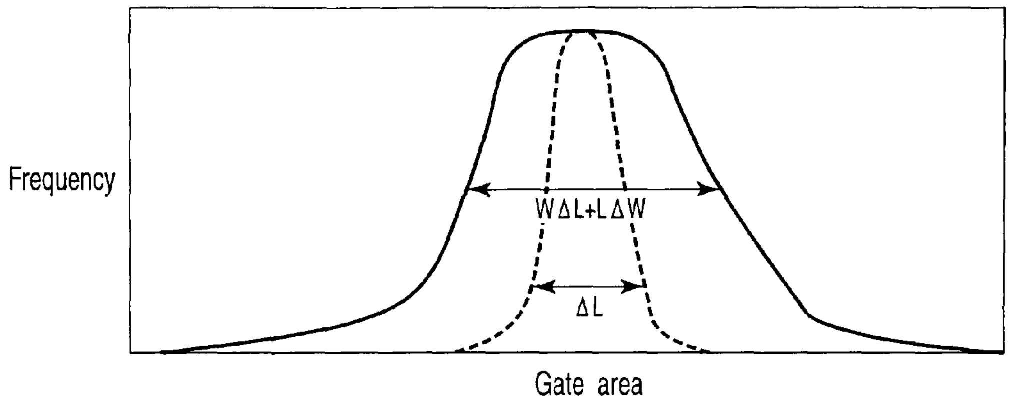
FIG. 9 is a diagram illustrating the frequency distribution of gate area.

FIG. 8A shows aging devices that are connected in parallel. These aging devices 11 differ in gate length L by manufacture error ΔL and in gate width W by manufacture error ΔW. FIG. 8C shows the frequency distribution of error ΔL, and FIG. 8B shows the frequency distribution of error ΔW. As shown in FIG. 9, the frequency distribution of gate area, WΔL+LΔW, is determined from the deviation of L and the deviation of W.

Figure 10:
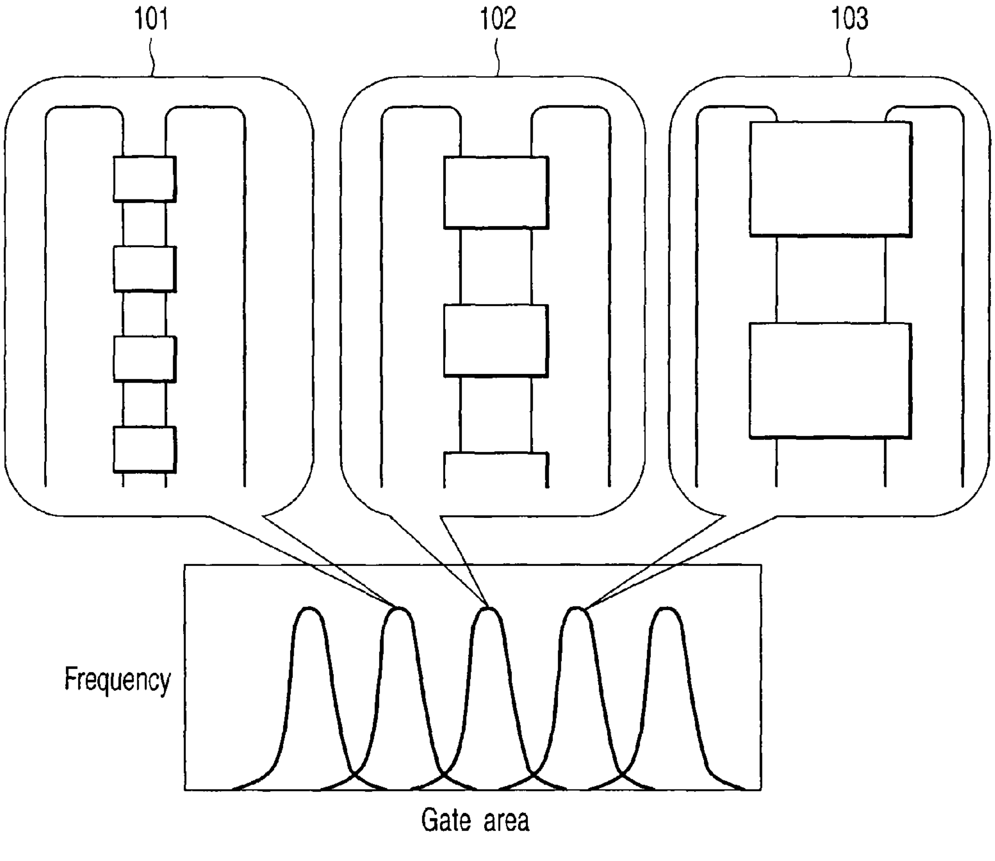
FIG. 10 is a diagram showing the frequency distribution of gate areas for three groups of aging devices, the devices of each group being connected in parallel.

FIG. 10 represents the frequency distributions of gate area for three groups of aging devices, the devices of each group being connected in parallel. In FIG. 10, reference number 101 indicates a group of aging devices having a small gate area, reference number 102 a group of aging devices having an intermediate gate area, and reference number 103 a group of aging devices having a large gate area. Each group consists of a plurality of aging devices.

Figure 11:
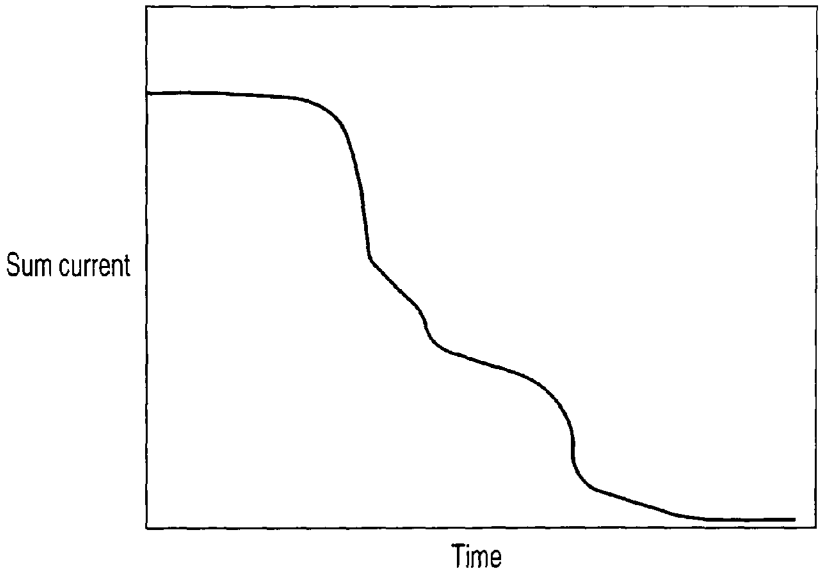
FIG. 11 is a diagram illustrating sum-current characteristic represented by a curve that is not smooth.

The sum-current characteristic of all aging devices that are connected in parallel is illustrated in FIG. 11. As FIG. 11 shows, the sum-current characteristic is represented by a curve that is not smooth. This is because the peaks different in target gate area are spaced apart as illustrated in FIG. 10.

Figure 12A:
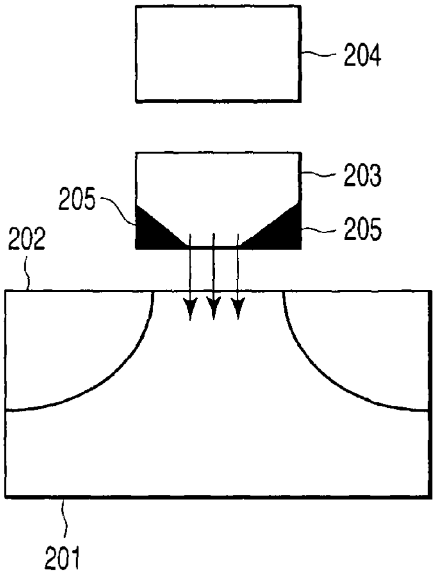
FIGS. 12A and 12B are sectional views of an element, explaining a factor called bird's beaks, which alters the characteristic.
Figure 12B:
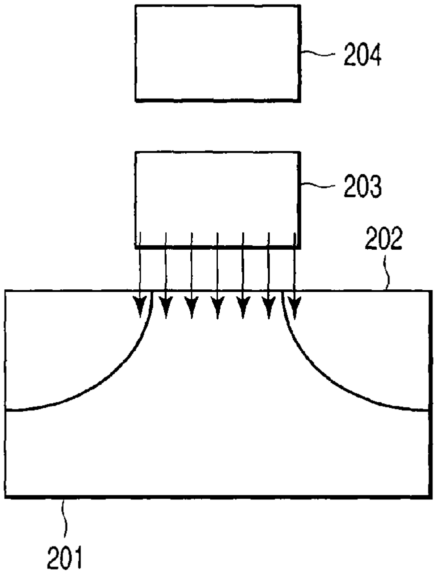

A factor known as bird's beaks, which alter the characteristic, effects the distribution as an inter-layer insulating film is formed between the cells, as is illustrated in FIG. 12A. In FIG. 12A, reference numbers 201, 202, 203, 204, and 205 designate a semiconductor substrate, a source-drain diffusion layer, a floating gate, a control gate and bird's beaks, respectively. The width of bird's beaks are about a few nanometers to tens of nanometers and can therefore be neglected if the cells are huge. In the present embodiment having small cells arranged in parallel, however, the bird's beaks cannot be neglected as a factor that influences the characteristic. FIG. 12B shows the distribution of leakage current, which is observed in a structure having no bird's beaks. As a comparison between FIG. 12A and FIG. 12B may reveal, the effective decrease of gate area decreases due to the bird's beaks.

The present embodiment is characterized chiefly in the positive use of a factor that alters the characteristic. The bird's beaks increase the thickness of the tunnel film at the gate end and ultimately decrease the leakage current at the gate end. The decrease of the leakage current is equivalent to a decrease of the gate area, in terms of the aging characteristic of the cells.

Figure 13:
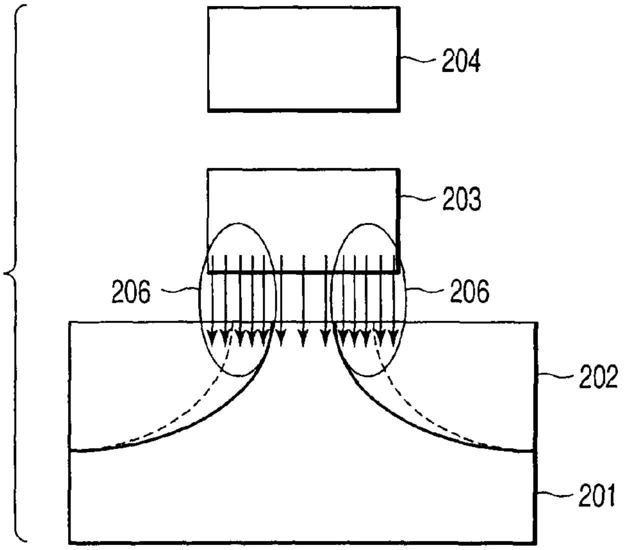
FIG. 13 is a sectional view of an element, explaining a factor, such as a gate overlapping effect, which alters the characteristic.

Another representative factor that alters the characteristic if the cells are small is such a gate overlapping effect as is illustrated in FIG. 13. In FIG. 13, reference number 206 designates a gate overlapping part. In this instance, a diffusion layer that has developed beneath the gate end causes a local increase of leakage current. This increase of leakage current is equivalent to an increase of the gate area, in terms of the aging characteristic of the cells.

Figure 14:
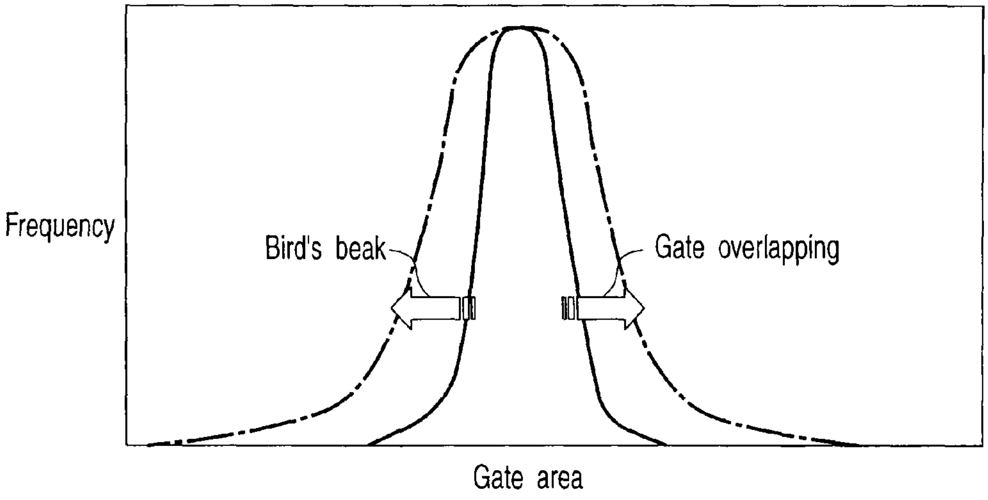
Figure 15:
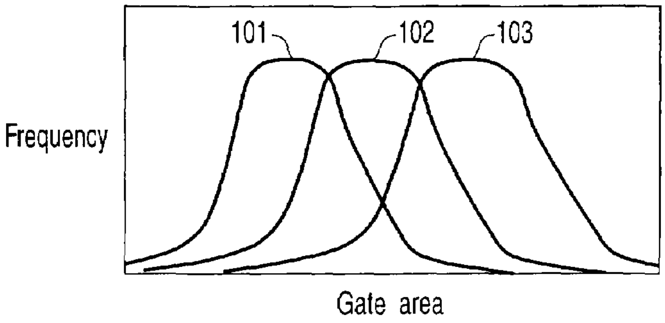
FIG. 15 is a diagram explaining how gate-area distributions overlap one another.

FIG. 14 shows a distribution of gate area for each group of aging devices, which has resulted from the bird's beaks and the gate overlapping effect. As seen from FIG. 14, the distribution of gate area expands to the left due to the bird's beaks and to the right due to the gate overlapping. The gate-area distribution for the group 101, the gate-area distribution for the group 102, and gate-area distribution for the group 103 greatly overlaps one another as shown in FIG. 15. If the cells corresponding to these gate-area distributions are connected in parallel, there will be obtained such aging characteristic as is indicated by the smooth solid-line curve shown in FIG. 15.

As described above, the present invention is characterized mainly in that a plurality of small cells is connected in parallel. The distributions of any factor influencing the cell characteristics and neglected for large cells, each distribution pertaining to one group of cells, are therefore overlapped to impart to the cells such an aging characteristic as is indicated by a smooth. That is, the cells of groups that greatly differ in characteristics are connected in parallel and are averaged in characteristics. The elapse time is read from the history of state transition, which has been smoothed by averaging the cells in characteristics. The averaging renders it easy to control the characteristic difference between the individual cells.

As has been described, the present embodiment can implement a timer function by using aging devices whose lifetime can be controlled operates without using batteries. Particularly, the timer function can be implemented by utilizing the intermediate transition state of the aging devices, each changing from the on-state to the off-state, without the necessity of using a tremendous number of aging devices. Moreover, the cells of a large group, which greatly differ in characteristics, are connected in parallel and are averaged in characteristics, and the elapse time is read from the history of state transition, which has been smoothed by averaging the cells in characteristics. Thus, the elapse time can be measured at high accuracy.

Namely, the aging devices are used to measure the time that elapses from the time the supplying of power is interrupted to the time the supplying of power is resumed. Thus, the number of aging devices required can be much reduced. This helps to lower the manufacturing cost of the system LSI.

Second Embodiment

Figure 16:
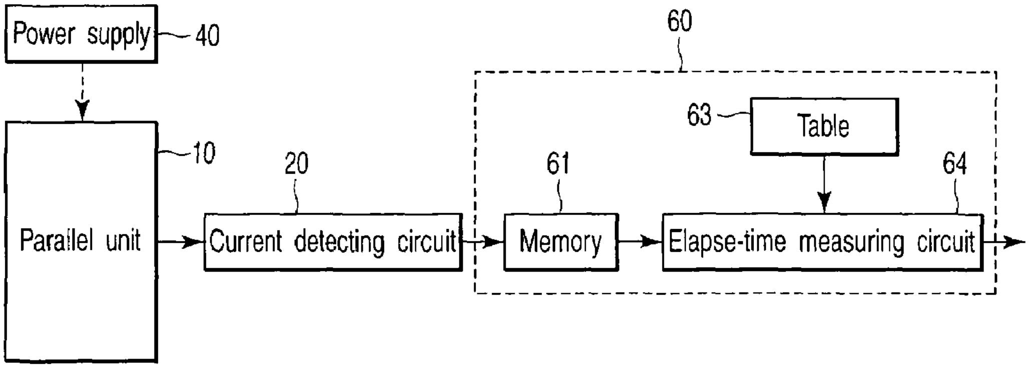
FIG. 16 is a block diagram schematically showing an electronic timer according to a second embodiment of this invention.

FIG. 16 is a block diagram schematically showing an electronic timer according to a second embodiment of this invention. The components identical to those shown in FIGS. 1 and 4 are designated at the same reference numbers and will not be described in detail.

This embodiment differs from the first embodiment in the configuration of the time measuring circuit. The embodiment is identical to the first embodiment in any other respects. The time measuring circuit 60 is composed of a memory 61, an elapse-time table 63, and an elapse-time measuring circuit 64. The memory 61 stores the value of the sum current detected by the current detecting circuit 20 when the supplying of power is resumed. The elapse-time table 63 stores the elapse-time change characteristic, i.e., the relation between the sum current of the parallel unit 10 and the time that has elapsed from the charge programming of every aging device of the parallel unit 10. The elapse-time measuring circuit 64 measures the time required to resume the supplying of power after the interruption of power supplying, from the sum current stored in the memory 61 and the elapse-time change characteristic stored in the table 63.

In this embodiment, the power supply 40 supplies power to the parallel unit 10 at relatively short intervals (e.g., 1 minute). In this case, the sum current of the parallel unit 10 when the supplying of power is interrupted is nearly equal to the initial value that is shown in FIG. 7.

Once the sum current of the parallel unit 10 is detected when the supplying of power is resumed, the time Tb determined by this sum current can be measured as the time required until the supplying of power is resumed from the moment the supplying of power is interrupted. Strictly speaking, the time Tb measured may be longer or shorter than it should be by, for example, 1 minute or less, which corresponds to the intervals at which the power supply 40 supplies power to the parallel unit 10. This error (i.e., 1 minute or less) will scarcely raise problems. The error can be decreased by accumulating the electric charge at shorter intervals. Even if the electric charge is accumulated at shorter intervals, the power consumption will little increase, because the charge accumulated corresponds to a very small current.

Third Embodiment

Figure 17:
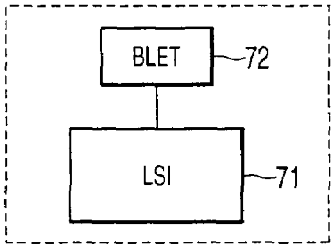
FIG. 17 is a block diagram depicting the basic configuration of a system LSI according to a third embodiment of this invention.

FIG. 17 is a block diagram depicting the basic configuration of a system LSI according to a third embodiment of this invention.

As shown in FIG. 17, an LSI chip 71 and a battery-less electronic timer (BLET) 72 are mounted on the same substrate. The electronic timer 72 is of the type according to the first and second embodiments. The electronic timer 72 is connected to the same power supply as the LSI chip 71 is. As has been explained in conjunction with the first and second embodiments, the electronic timer 72 measures the time that has elapsed from the interruption of power supplying to the resumption of power supplying, and supplies the data representing this time to the LSI chip 71 when the supplying of power is resumed. Note that the electronic timer 72 need not be mounted on the same substrate, along with the LSI chip 71. It only needs to be connected to the power supply to which the LSI chip 71 is connected.

With this configuration, the electronic timer 72 can measure the time that has elapsed from an interruption of power supplying, if any, to the resumption of power supplying. The data representing the time measured is supplied to the LSI chip 71. The LSI chip 71 can accurately determine how long the supplying of power has been interrupted and can therefore perform a process to cope with the interruption of power supplying.

The electronic timer 71 can be a battery-less one by using aging devices as has been explained in conjunction with the first or second embodiment. This serves to lower the manufacturing cost.

MODIFICATION

The present invention is not limited to the embodiments described above. In the embodiments, the aging devices used in the parallel unit are pMOS transistors of normally-off type. Instead, PMOS transistors of normally-on type, nMOS transistors of normally-off type, or nMOS transistors of normally-on type can be used as aging devices in the present invention. Furthermore, the number of aging devices that constitute the parallel unit, the number of aging devices, and the number of groups of aging deices can be changed as needed in accordance with the specification of the electronic timer.

The electronic timer according to this invention can be used to safeguard the system LSI against an abrupt power failure due to a blackout.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system LSI comprising:

a semiconductor chip which receives power from a power supply;

an electronic timer which measures a time from an interruption of power supplying to the semiconductor chip to a resumption of power supplying to the semiconductor chip, the timer including a parallel unit comprised of a plurality of aging devices connected in parallel and having input and output terminals, each of the aging devices being configured to be turned from on to off, or, from off to on without the power supply for a predetermined time defined with amounts of stored electric charge and formed of a transistor which includes a floating gate;

a current detecting unit configured to detect a sum current of currents flowing in the aging devices of the parallel unit when a voltage is applied between the input and output terminals of the parallel unit; and a time measuring unit configured to measure a time from immediately after the interruption of power supplying to the resumption of power supplying from the sum current, the time measuring unit including an elapse-time table which stores an elapse-time change characteristic;

a memory which stores the sum current detected at the resumption of power supplying; and an elapse-time measuring circuit which measures the time from immediately after the interruption of power supplying to the resumption of power supplying, from the sum current stored in the memory and the elapse-time change characteristic stored in the table.

2. The system LSI according to claim 1, wherein the time measuring unit stores a first sum current detected immediately before the interruption of power supplying and a second sum current detected at the resumption of power supplying, and measures the time from immediately after the interruption of power supplying to the resumption of power supplying, on the basis of the stored first sum current and the stored second sum current and the elapse-time change characteristic in an intermediate transition state in which the parallel unit changes from an on-state to an off-state or vice versa, and which represents a relation between the sum current and a time elapsed after a charge is stored in each of the aging devices.

3. The system LSI according to claim 2, wherein the time measuring unit includes:

a first memory which stores the first sum current; and a second memory which stores the second sum current;

wherein the elapse-time measuring circuit measures the time from immediately after the interruption of power supplying to the resumption of power supplying from the first sum current and the second sum current stored in the first memory and the second memory, respectively, and the elapse-time change characteristic stored in the table.

4. The system LSI according to claim 3, wherein the elapse-time measuring circuit detects a first time from the first sum current stored in the first memory and the elapse-time change characteristic stored in the table and a second time from the second sum current stored in the second memory and the elapse-time change characteristic stored in the table, and outputs a difference between the first time and the second time.

5. The system LSI according to claim 3, wherein the table is updated at regular intervals.

6. The system LSI according to claim 1, wherein each of the aging devices is electrically charged at regular intervals.

7. The system LSI according to claim 1, wherein the aging devices are of different types which differ in terms of designed gate area.

8. The system LSI according to claim 1, wherein the aging devices are of different types which differ in terms of designed channel length.

9. A system LSI comprising:

a semiconductor chip which receives power from a power supply;

an electronic timer which measures a time from an interruption of power supplying to the semiconductor chip to a resumption of power supplying to the semiconductor chip, the timer including:

a parallel unit comprised of a plurality of aging devices connected in parallel and having an input terminal and an output terminal, each of the aging devices being configured to be turned from on to off, or, from off to on without the power supply for a predetermined time defined with amounts of stored electric charge and formed of a transistor including a floating gate storing the electric charge;

a current detecting unit configured to detect a sum current of currents flowing in the aging devices of the parallel unit when a voltage is applied between the input and output terminals of the parallel unit;

an elapse-time table which stores an elapse-time change characteristic representing a relation between the sum current and a time that has elapsed from the storing of the electric charge in each of the aging devices;

a first memory which stores a first sum current detected by the current detecting unit immediately before the interruption of power supplying;

a second memory which stores a second sum current detected by the current detecting unit at the resumption of power supplying; and an elapse-time measuring unit which measures a time from immediately after the interruption of power supplying to the resumption of power supplying, using the first sum current and the second sum current stored in the first memory and the second memory, respectively, and the elapse-time change characteristic stored in the table.

10. The system LSI according to claim 9, wherein the elapse-time measuring unit measures a first time from the first sum current stored in the first memory and the elapse-time change characteristic stored in the table and a second time from the second sum current stored in the second memory and the elapse-time change characteristic stored in the table, and outputs a difference between the first time and the second time.

11. The system LSI according to claim 9, wherein the table is updated at regular intervals.

12. The system LSI according to claim 9, wherein each of the aging devices is electrically charged at regular intervals.

13. The system LSI according to claim 9, wherein the aging devices are of different types which differ in terms of designed gate area.

14. The system LSI according to claim 9, wherein the aging devices are of different types which differ in terms of designed channel length.

* * * * *